(12) United States Patent
Tal et al.

(10) Patent No.: US 9,935,828 B2
(45) Date of Patent: Apr. 3, 2018

(54) APPLICATION CONTROLLER TO SUPPORT INCREMENTAL DEPLOYMENT

(71) Applicant: SAP SE, Walldorf (DE)

(72) Inventors: Shimon Tal, Kefar Haornim (IL); Lior Okman, Tzoran (IL)

(73) Assignee: SAP SE, Walldorf (DE)

( * ) Notice: Subject to any disclaimer, the term of this patent is extended or adjusted under 35 U.S.C. 154(b) by 137 days.

(21) Appl. No.: 15/218,558

(22) Filed: Jul. 25, 2016

(65) Prior Publication Data

US 2018/0026842 A1 Jan. 25, 2018

(51) Int. Cl.
*H04L 12/24* (2006.01)
*H04L 29/08* (2006.01)

(52) U.S. Cl.
CPC .......... *H04L 41/0813* (2013.01); *H04L 67/10* (2013.01); *H04L 67/26* (2013.01)

(58) Field of Classification Search
CPC ...... H04L 41/0813; H04L 67/10; H04L 67/26
See application file for complete search history.

(56) References Cited

U.S. PATENT DOCUMENTS

| | | | | |
|---|---|---|---|---|
| 7,813,822 B1* | 10/2010 | Hoffberg | ............ | G06K 9/00369 381/73.1 |
| 8,725,123 B2* | 5/2014 | Raleigh | ................. | H04L 41/046 455/414.1 |
| 8,793,758 B2* | 7/2014 | Raleigh | ................... | G06F 21/57 455/414.1 |
| 2012/0087319 A1* | 4/2012 | Raleigh | ................. | H04W 48/18 370/329 |
| 2012/0096513 A1* | 4/2012 | Raleigh | ............... | H04L 12/1403 726/1 |
| 2012/0167162 A1* | 6/2012 | Raleigh | ................... | G06F 21/57 726/1 |
| 2012/0221955 A1* | 8/2012 | Raleigh | ................. | H04M 15/00 715/736 |
| 2013/0127980 A1* | 5/2013 | Haddick | ................. | G06F 3/013 348/14.08 |
| 2014/0059640 A9* | 2/2014 | Raleigh | ............... | H04L 12/1403 726/1 |
| 2014/0094159 A1* | 4/2014 | Raleigh | ................. | H04W 24/02 455/418 |
| 2014/0198687 A1* | 7/2014 | Raleigh | ................. | H04L 67/306 370/259 |

* cited by examiner

*Primary Examiner* — Ranodhi Serrao
(74) *Attorney, Agent, or Firm* — Buckley, Maschoff & Talwalker LLC (57) ABSTRACT

A system includes reception of a request associated with a cloud-based application at an external port of a container associated with the cloud-based application, passage of the request to an application controller associated with the cloud-based application, determination of whether the request includes a command to modify the cloud-based application, invocation of a function to execute the command if it is determined that the request includes a command to modify the cloud-based application, and forwarding of the request to the cloud-based application at a second port different from the external port if it is determined that the request does not include a command to modify the cloud-based application.

12 Claims, 6 Drawing Sheets

APPLICATION CONTROLLER TO SUPPORT INCREMENTAL DEPLOYMENT

BACKGROUND

Figure 1:
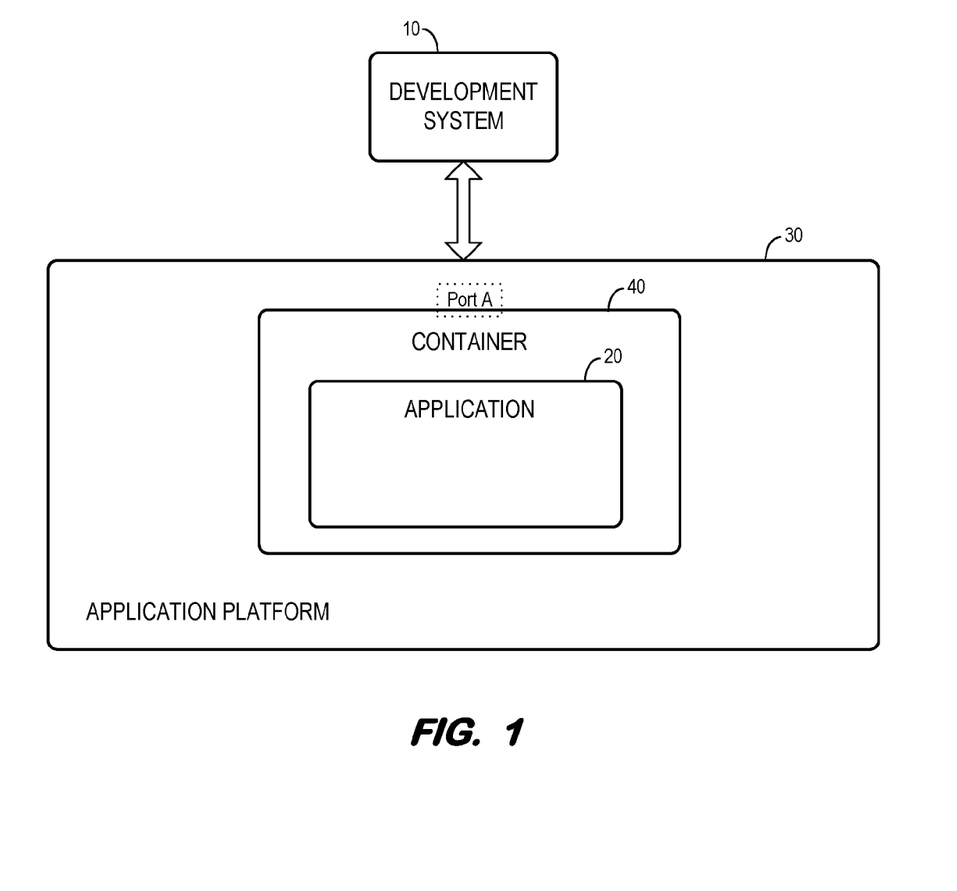
FIG. 1 is a block diagram of a system architecture.

As shown in FIG. 1, a software developer may operate a development system 10 to develop a cloud-based application 20 conforming to a cloud-native application framework, and push (i.e., deploy) the developed application to cloud-based application platform 30. Cloud-based application platform 30 supports application lifecycle stages including development, testing and deployment. Application platform 30 hosts application 20 within container 40, which communicates to the outside world via a single Transmission Control Protocol (TCP) port.

A developer will typically modify application 20 several times (e.g., for debugging, incremental deployment, etc.) after initial deployment. In order to reflect these modifications in the deployed application, the developer re-pushes (now-modified) application 20 to platform 30. As a result, container 40 which hosts application 20 is killed and application 20 is re-deployed to a new container which is associated with a new TCP port. This process may be time- and resource-intensive. Improved support for development activities is desired.

DETAILED DESCRIPTION

The following description is provided to enable any person in the art to make and use the described embodiments. Various modifications, however, will remain readily apparent to those in the art.

Some embodiments provide an application controller within the above-mentioned container, which functions as a wrapper to the application. The application controller assumes responsibility for the external TCP port of the container and acts as a reverse proxy to route application requests to the application. The application controller may thereby allow management of the application resources and/or actions of the deployed application without instantiation of a new container (with a new TCP port) as described above.

According to some embodiments, the application controller examines any traffic arriving at the port and either passes the traffic to the wrapped application, or treats the traffic as a command and executes the command. For example, executing a command to replace some or all of the files in the application filesystem enables hot-deployment of static resources served by the wrapped application.

In some embodiments, the application controller further provides a plugin mechanism which allows extension developers to add new functionality. The plugin mechanism may include an extensible plugin framework to allow different domain types to be served and supported. For example, incremental deployment of static resource-based applications such as static websites may simply require replacement of a static resource in the wrapped application (i.e., web server), while Node.js applications require restarting of the wrapped application after resources are refreshed.

Figure 2:
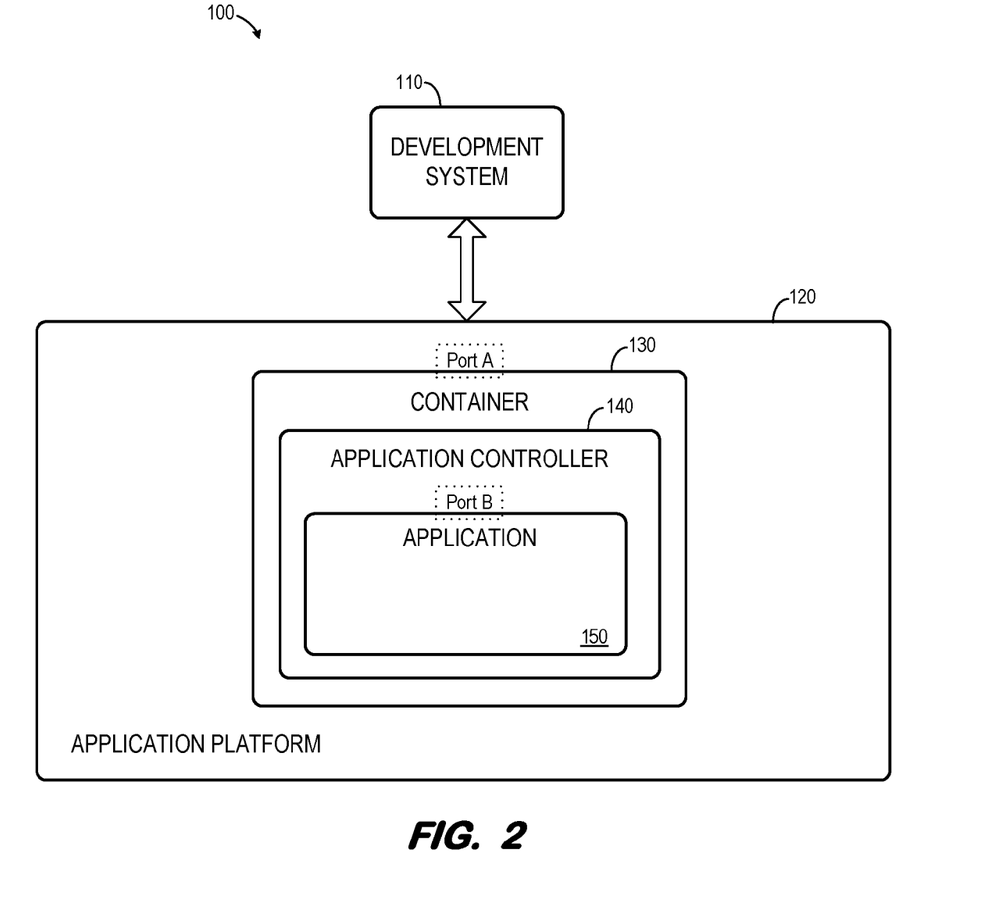
FIG. 2 is a block diagram of a system architecture according to some embodiments.

FIG. 2 is a block diagram of system architecture 100 according to some embodiments. Architecture 100 includes development system 110 and application platform 120. Embodiments are not limited to architecture 100.

Any of the depicted elements of architecture 100 may be implemented by one or more hardware devices coupled via any number of public and/or private networks. Two or more of such devices may be located remote from one another all devices may communicate with one another via any known manner of network(s) and/or via a dedicated connection.

Development system 110 may comprise any computing system providing a development environment for developing program code. The program code may conform to a cloud-native application format. Development system 110 may comprise a desktop computer, a laptop computer, a netbook computer, a tablet computer, a smartphone, and/or any other computing system that is or becomes known. For example, development system 110 may include a memory storing program code of an Integrated Development Environment and one or more processors to execute the code. The code of the Integrated Development Environment may be located remote from system 110 and provided as a service, in which system 110 executes program code of a client application such as a Web browser.

Application platform 120 supports application lifecycle stages including development, testing and deployment. Application platform 120 may provide a Platform as-a-service (PaaS) as is known in the art. Accordingly, application platform 120 may communicate with development system 110 via a Web-based protocol such as HyperText Transfer Protocol (HTTP) or WebSocket.

Application platform 120 has instantiated container 130, which may comprise a PaaS application container as is known in the art. As is not known in the art, container 130 includes an instantiation of application controller 140, which functions as a wrapper to application 150. Application controller 140 assumes responsibility for the external TCP port (i.e., Port A) of container 130 and routes application requests to application 150 via its port (i.e., Port B).

Figure 3:
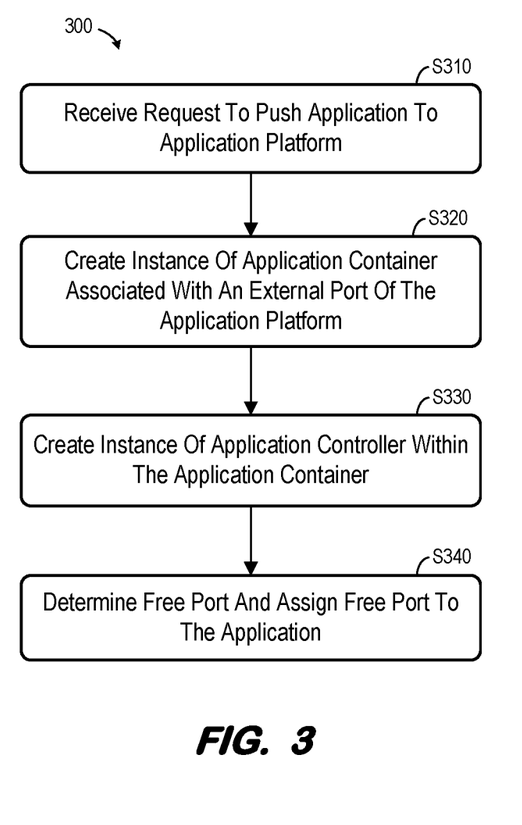
FIG. 3 is a flow diagram according to some embodiments.

FIG. 3 is a flow diagram of process 300 for instantiating an application controller according to some embodiments. Process 300 and each other process described herein may be embodied in processor-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. Accordingly, a processor of any suitable device or devices may execute the program code to cause the device or devices to operate as described. In some embodiments, hard-wired circuitry may be used in place of, or in combination with, program code for implementation of processes according to some embodiments. Embodiments are therefore not limited to any specific combination of hardware and software.

Initially, at S310, a request is received to push an application to an application platform. For example, a developer may enter a command into development system 110 to instruct development system 110 to transmit code of an application to application platform 120.

At S320, an instance of an application container is created. The instance is intended to contain the application and is associated with an external port of the application platform 120. In this regard, S310 and S320 may proceed as is known in the art.

However, at S330, an instance of an application controller (e.g., application controller 140) is created within the application container. As described above, the application controller is a wrapper of the application and will receive traffic from the container which is intended for the application. At S340, the application controller determines a free port (e.g., Port B) of the application platform and assigns the determined port to the application. The port is assigned because the original port is used by the application controller as described above.

As mentioned above, application controller 140 may receive a request which arrives at the port of container 130. Application controller 140 examines the request and determines whether the request is a command or a call to application 150. For example, commands may follow the syntax: <host>:<port>/<UUID>/command. If the request is a command, application controller 140 may execute the command using its built-in functionality.

For example, if a command is received to replace all resources of application 150, application controller 140 retrieves the files of application 150 (e.g., from a resources folder under app/web/resources) and replaces all the application resources in the runtime filesystem of application platform 120. Re-pushing the application as described in the Background may thereby be avoided, allowing a user to quickly see the changes reflected in a client system.

Functionality supporting commands may also be provided by a plug-in framework according to some embodiments. Such a framework may also supports the addition of new commands.

Figure 4:
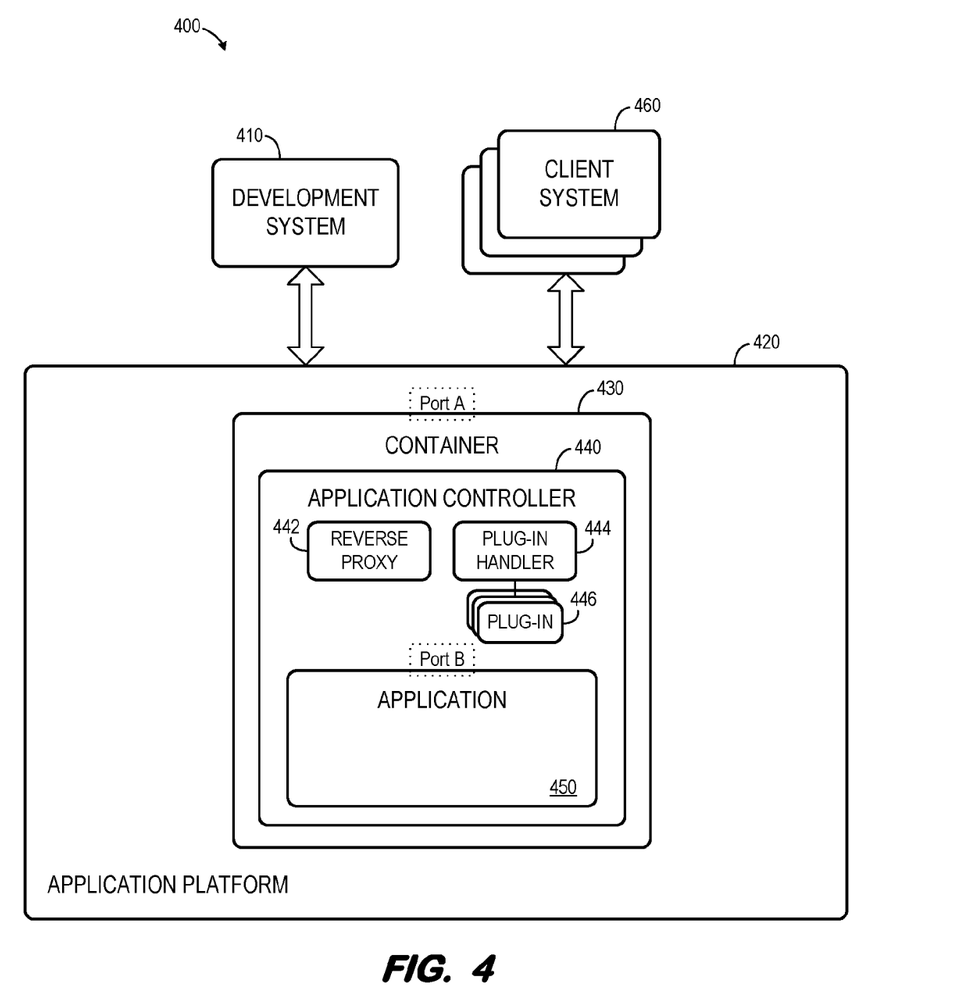
FIG. 4 is a block diagram of a system architecture according to some embodiments.

FIG. 4 is a view of system architecture 400 including a plug-in framework according to some embodiments. Development system 410, application platform 420, container 430 and application 450 may be implemented as described with respect to similarly-named components of FIG. 2. Client systems 460 may comprise computing systems operated by users of application 450 in a runtime capacity.

Application controller 440 includes reverse proxy 442, plug-in handler 444 and plug-ins 446. Container 430, application controller 440 and application 450 may be instantiated as described above with respect to process 300 of FIG. 3.

According to some embodiments, each of plug-ins 446 is self-contained and isolated, can be loaded from any Uniform Resource Indicator (URI), may expose 0 . . . n functions, includes a central (private) plug-in controller for event handling, and is stored in a plug-in folder in application controller 440. Plug-in handler 444 of application controller 440 may provide the plugin's mechanism, which can provide other functionality to any native functions, such as save/run/replace project. The plug-in framework may provide efficient support of several application types, including but not limited to static-file, Node.js, Java, and C/C++ applications.

In one example of plug-in creation to provide extended functionality, a user may clone the application controller, create, in the plug-in folder, a new javascript module file implementing the extended functionality, and create a new JSON file which indicates the plug-in interface. Other non-exhaustive examples include implementing application controller 440 as a Java tool, and using XML as the plug-in interface, or using Java introspection with code annotations for identifying plug-ins. Embodiments may employ Node.JS to implement application controller 440, leading to the use of JSON as mentioned above and the flow described herein to create a plug-in.

Accordingly, each plug-in may consist of two files.

The following is an example of the aforementioned JSON file:

plugin.json structure

```
{
    "Providers": [
        {
            "save": {
                "path": "/save",
                "function": "saveFn",
                "method": "post"
            },
            "delete": {
                "path": "/delete",
                "function": "deleteFn",
                "method": "delete"
            },
        }
    ]
}
```

According to the above structure, the entry name (e.g. "save") semantically indicates the function, "path" indicates which path to listen to during runtime, "function" indicates the function to handle/invoke via request, and "method" specifies corresponding HTTP actions such as post/get, etc.

Figure 5:
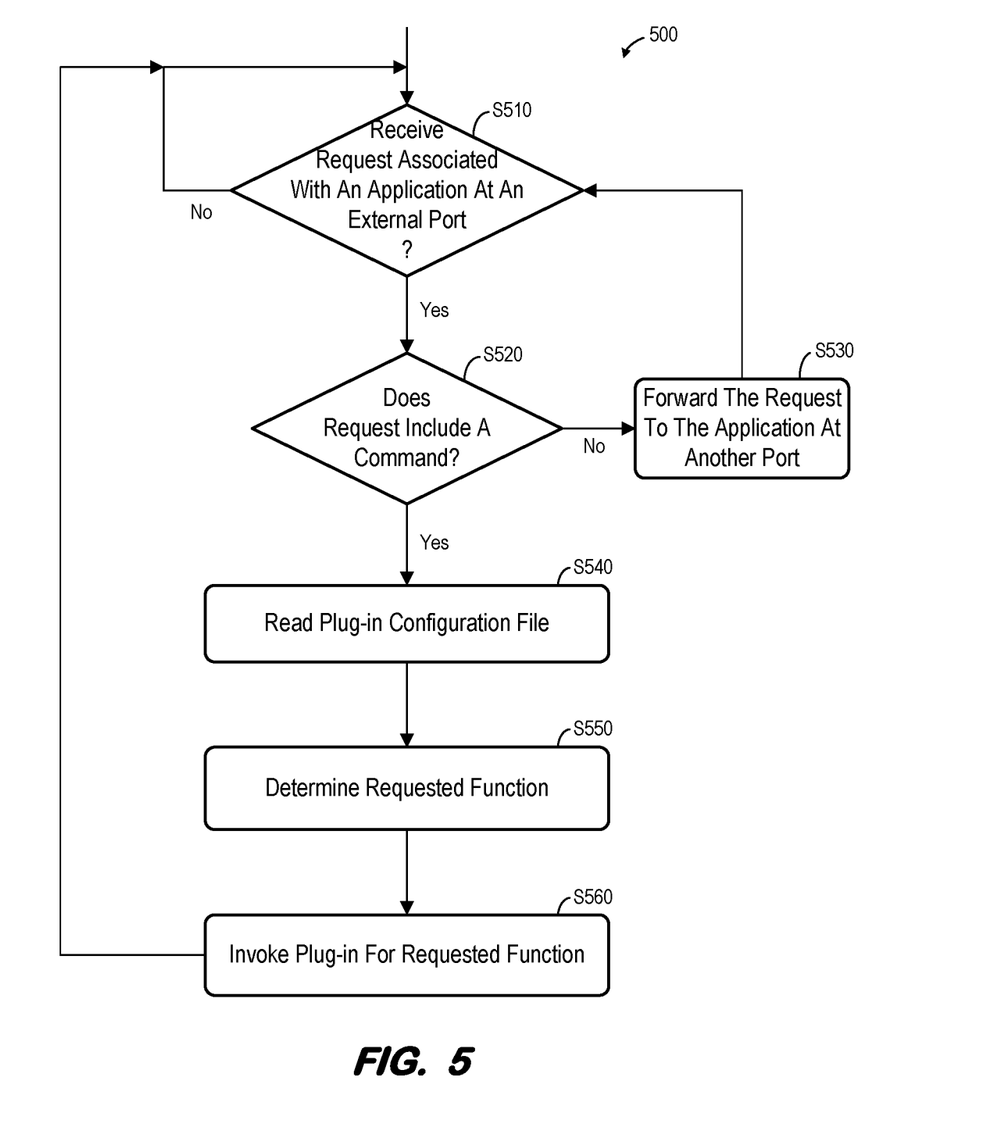
FIG. 5 is a flow diagram according to some embodiments.

FIG. 5 is a flow diagram of process 500 according to some embodiments. Process 500 will be described with respect to application controller 440 of system 400.

Flow initially pauses at S510 until a request associated with an application is received at an external port. For example, a request associated with application 450 may be received by container 430 at Port A and then passed thereby to application controller 440. The request may be received from development system 410 or one of client systems 460.

At S520, it is determined whether the request includes a command. The syntax of commands may be predetermined, such as the syntax <host>:<port>/<UUID>/command mentioned above. Using a UUID in this URI structure may reduce or prevent the chance that the command being implemented conflicts with a command actually provided by application 450. Accordingly, S520 may comprise a determination by application controller 440 of whether the request corresponds to the command syntax. If not, the request is forwarded to application 450 at Port B at S530. Application 450 then serves the request as intended by the developer of application 450. In this regard, the request may have been received from one of client systems 460 accessing platform 420 in a runtime mode.

Flow proceeds to S540 if it is determined at S520 that the request includes a command. A plug-in configuration file corresponding to the command is read at S440 to determine the corresponding plug-in interface, and the requested function is determined based on the received request and the interface. Next, at S560, the plug-in is invoked for the requested function.

Figure 6:
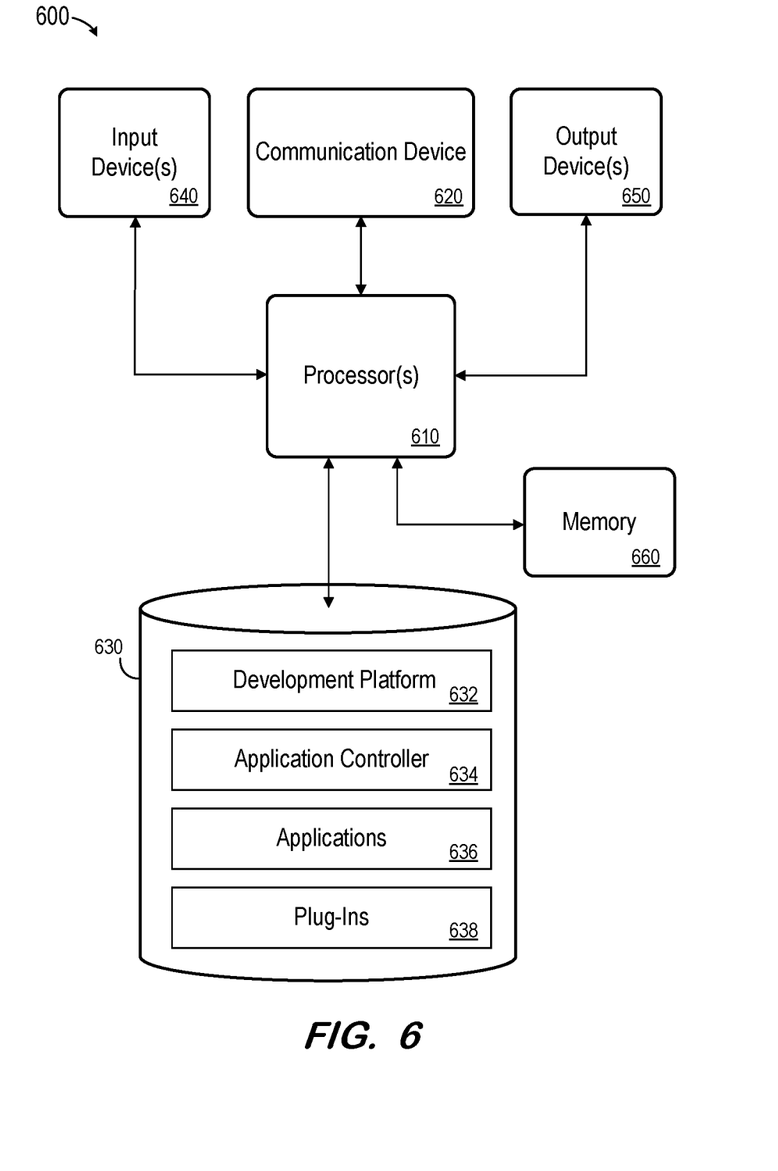
FIG. 6 is a block diagram of a hardware system according to some embodiments.

FIG. 6 is a block diagram of apparatus 600 according to some embodiments. Apparatus 600 illustrates a hardware architecture implementing a development platform as described above, but implementations are not limited thereto. Elements of apparatus 600 may therefore operate to execute methods as described above. Apparatus 600 may include other unshown elements according to some embodiments.

Apparatus 600 includes processor(s) 610 operatively coupled to communication device 620, data storage device 630, one or more input devices 640, one or more output devices 650 and memory 660. Communication device 620 may facilitate communication with external computing systems, such as development systems. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent non-transitory storage media, including combinations of magnetic storage devices (e.g., magnetic tape, hard disk drives and flash memory), optical storage devices, Read Only Memory (ROM) devices, etc., while memory 660 may comprise Random Access Memory (RAM).

Development platform 632 and application controller 634 of data storage device 630 may comprise program code executable by processor 610 to provide any of the functions described herein, including but not limited to processes 300 and 500. Embodiments are not limited to execution of these functions by a single apparatus. Applications 636 and plug-ins 638 may comprise program code as described above, with each of plug-ins 638 comprising a configuration file and an executable file. Data storage device 630 may also store data and other program code for providing additional functionality and/or which are necessary for operation thereof, such as device drivers, operating system files, etc.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
 a processor; and
 a memory storing processor-executable process steps executable by the processor to cause the system to:
 receive a request associated with a cloud-based application at an external port of a container associated with the cloud-based application;
 pass the request to an application controller associated with the cloud-based application;
 determine whether the request includes a command to modify the cloud-based application;
 if it is determined that the request includes a command to modify the cloud-based application, invoke a function to execute the command;
 if it is determined that the request does not include a command to modify the cloud-based application, forward the request to the cloud-based application at a second port different from the external port;
 receive a request to push the cloud-based application to a cloud application platform;
 in response to the request to push, instantiate the container, the instantiated container associated with the external port;
 in response to the request to push, instantiate the application controller within the container; and
 determine that the second port is unassigned and assign the second port to the cloud-based application.

2. A system according to claim 1, wherein invocation of a function to execute the command comprises:
 determination of a plug-in configuration file associated with the command; and
 determination of the function based on the command and the plug-in configuration file.

3. A system according to claim 2, the process steps further executable by the processor to cause the system to:
 receive a second request associated with the cloud-based application at the external port of the container associated with the cloud-based application;
 pass the second request to the application controller associated with the cloud-based application;
 determine that the second request includes a second command to modify the cloud-based application;
 determine a second plug-in configuration file associated with the second command;
 determine a second function based on the second command and the second plug-in configuration file; and
 invoke the second function to modify the cloud-based application.

4. A system according to claim 1, the process steps further executable by the processor to cause the system to:
 receive a second request associated with a second cloud-based application at a second external port of a second container associated with the second cloud-based application;
 pass the second request to a second application controller associated with the second cloud-based application;
 determine that the second request includes a second command to modify the second cloud-based application;
 if it is determined that the second request includes a second command to modify the second cloud-based application, invoke a second function to execute the second command; and
 if it is determined that the second request does not include a second command to modify the second cloud-based application, forward the second request to the second cloud-based application at a third port different from the external port, the second external port, and the second port.

5. A method implemented by a computing system in response to execution of program code by a processor of the computing system, the method comprising:
 receiving a request associated with a cloud-based application at an external port of a container associated with the cloud-based application;
 passing the request to an application controller associated with the cloud-based application;
 determining whether the request includes a command to modify the cloud-based application;
 if it is determined that the request includes a command to modify the cloud-based application, invoking a function to execute the command;
 if it is determined that the request does not include a command to modify the cloud-based application, forwarding the request to the cloud-based application;
 receiving a request to push the cloud-based application to a cloud application platform;
 in response to the request to push, instantiating the container, the instantiated container associated with the external port;

in response to the request to push, instantiating the application controller within the container; and
determine that a port is unassigned and assigning the port to the cloud-based application.

6. A method according to claim 5, wherein invoking a function to execute the command comprises:
determining a plug-in configuration file associated with the command; and
determining the function based on the command and the plug-in configuration file.

7. A method according to claim 6, further comprising:
receiving a second request associated with the cloud-based application at the external port of the container associated with the cloud-based application;
passing the second request to the application controller associated with the cloud-based application;
determining that the second request includes a second command to modify the cloud-based application;
determining a second plug-in configuration file associated with the second command;
determining a second function based on the second command and the second plug-in configuration file; and
invoking the second function to modify the cloud-based application.

8. A method according to claim 5, further comprising:
receiving a second request associated with a second cloud-based application at a second external port of a second container associated with the second cloud-based application;
passing the second request to a second application controller associated with the second cloud-based application;
determining that the second request includes a second command to modify the second cloud-based application;
if it is determined that the second request includes a second command to modify the second cloud-based application, invoking a second function to execute the second command; and
if it is determined that the second request does not include a second command to modify the second cloud-based application, forwarding the second request to the second cloud-based application.

9. A computing system implementing a cloud-based application platform, the cloud-based application platform comprising:
a processor; and
a memory storing processor-executable process steps executable by the processor to cause the system to provide:
a container associated with an external port, the container to receive a request associated with a cloud-based application at the external port; and
an application controller associated with the cloud-based application, the application controller to receive the request from the container, to determine whether the request includes a command to modify the cloud-based application, to invoke a function to execute the command if it is determined that the request includes a command to modify the cloud-based application, to forward the request to the cloud-based application at a second port different from the external port if it is determined that the request does not include a command to modify the cloud-based application, to receive a request to push the cloud-based application to a cloud application platform and, in response to the request to push, instantiate the container, instantiate the application controller within the container, determine that the second port is unassigned and assign the second port to the cloud-based application.

10. A computing system according to claim 9, wherein invocation of a function to execute the command comprises:
determination of a plug-in configuration file associated with the command; and
determination of the function based on the command and the plug-in configuration file.

11. A computing system according to claim 10,
the container further to receive a second request associated with the cloud-based application at the external port; and
the application controller further to receive the second request, determine that the second request includes a second command to modify the cloud-based application, determine a second plug-in configuration file associated with the second command, determine a second function based on the second command and the second plug-in configuration file, and invoke the second function to modify the cloud-based application.

12. A computing system according to claim 9, the application platform further comprising
a second container associated with a second external port, the second container to receive a second request associated with a second cloud-based application at the second external port; and
a second application controller associated with the second cloud-based application, the second application controller to receive the second request from the second container, to determine whether the second request includes a second command to modify the second cloud-based application, to invoke a second function to execute the second command if it is determined that the second request includes a second command to modify the second cloud-based application, and to forward the second request to the second cloud-based application at a third port different from the external port, the second external port, and the second port if it is determined that the second request does not include a second command to modify the second cloud-based application.

* * * * *